(12) United States Patent
De et al.

(10) Patent No.: US 11,222,154 B2
(45) Date of Patent: Jan. 11, 2022

(54) STATE TABLE COMPLEXITY REDUCTION IN A HIERARCHICAL VERIFICATION FLOW

(71) Applicant: Synopsys, Inc., Mountain View, CA (US)

(72) Inventors: Kaushik De, Pleasanton, CA (US); Rajarshi Mukherjee, San Jose, CA (US); David L. Allen, Fremont, CA (US); Bhaskar Pal, Bangalore (IN); Sanjay Gulati, New Delhi (IN); Gaurav Pratap, Noida (IN); Nishant Patel, Milpitas, CA (US); Malitha Kulatunga, Colombo (LK); Sachin Bansal, Noida (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/063,059

(22) Filed: Oct. 5, 2020

(65) Prior Publication Data

US 2021/0110093 A1 Apr. 15, 2021

(30) Foreign Application Priority Data

Oct. 10, 2019 (IN) .............................. 201911041066

(51) Int. Cl.
*G06F 30/3308* (2020.01)
*G06F 1/3296* (2019.01)
*G06F 1/28* (2006.01)
*G06F 119/06* (2020.01)

(52) U.S. Cl.
CPC ............ *G06F 30/3308* (2020.01); *G06F 1/28* (2013.01); *G06F 1/3296* (2013.01); *G06F 2119/06* (2020.01)

(58) Field of Classification Search
CPC ...... G06F 30/3308; G06F 1/3296; G06F 1/28; G06F 2119/06; G06F 30/367
See application file for complete search history.

(56) References Cited

U.S. PATENT DOCUMENTS

| 10,311,192 | B2* | 6/2019 | Venkatesh | ............. G06F 30/398 |
| 2005/0021319 | A1* | 1/2005 | Li | ......................... G06F 30/367 703/2 |
| 2012/0166831 | A1* | 6/2012 | Shimoda | ............... G06F 1/3237 713/320 |

* cited by examiner

*Primary Examiner* — Stacy Whitmore
(74) *Attorney, Agent, or Firm* — Patterson + Sheridan, LLP (57) ABSTRACT

State table complexity reduction in a hierarchical verification flow is provided by identifying peripheral supplies and non-peripheral supplies in a hierarchical group in a hierarchical logical block model of a circuit based on whether logic blocks associated with the power supplies provide outputs to or receive inputs from circuity external to the hierarchical group; merging associated power state tables for the peripheral supplies and the non-peripheral supplies in the hierarchical group to create a merged power state table for the hierarchical group; removing, by a processing device, any power states associated with the non-peripheral supplies from the merged power state table to create a reduced power state table; and modeling a reduced logical block based on the reduced power state table.

20 Claims, 10 Drawing Sheets

STATE TABLE COMPLEXITY REDUCTION IN A HIERARCHICAL VERIFICATION FLOW

CROSS-REFERENCES TO RELATED APPLICATIONS

The present disclosure claims priority to India Provisional Patent Application IN201911041066 filed Oct. 10, 2019, entitled "STATE TABLE COMPLEXITY REDUCTION IN HIERARCHICAL VERIFICATION FLOW", which is incorporated herein by reference in its entirety.

TECHNICAL FIELD

The present disclosure generally relates to verification of a circuit design and more specifically relates to reducing the complexity of state tables used in a hierarchical verification flow.

BACKGROUND

When designing and analyzing the logic and components of a circuit, the size of the circuit design affects the time and computing resources needed to evaluate the circuit. As the number of logic gates (and other components) in a circuit increase, so too does the time and/or computing resources needed to evaluate that circuit—sometimes taking days to complete a single evaluation. In addition to the logic for analyzing the various gates, the physical characteristics of those logic gates are also analyzed, including physical size and layout, incoming/outgoing traces, and the power supplies. The various power states for the voltage supplies (including OFF and one or more ON values) are often modeled or tracked in Power State Tables (PST) according to various power intent standards, such as the Unified Power Formant (UPF) and Common Power Format (CPF) standards. As the number of logic gates grow, so too do the number of PSTs, and the complexity in modeling those PSTs.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Embodiments of the present disclosure relate to simplifying the modeling of logical circuit elements, particularly to simplifying the modeling of Power State Tables (PST). As modern circuit designs can include several billions of logic gates, designers can turn to various modelling techniques that use "black-box" models of the logic blocks to simplify and speed up analysis of the logic performed by the circuit. However, these simplifications still should account for the physical operation of the modeled logic gates therein, including the power supplies and associated PSTs for the logic gates.

To simplify the complexity associated with handling PSTs for a large number of power supplies (e.g., several thousands of power supplies) according to the present disclosure, in one embodiment, a modeler applies and analyzes a hierarchical verification model of a design for the logic block to identify which power supplies do not affect a low power signoff computation at a higher level in the hierarchy to remove orphaned states. As used herein, the power supplies for logic blocks that do not provide logical outputs to a next-higher level in the model are referred to as Non-Peripheral Supplies (NPS) of the logic block. Similarly, as used herein, the power supplies for logic blocks that do provide logical outputs to a next-higher level in the model are referred to as Peripheral Supplies (PS). Accordingly, computational complexity of merging two or more PSTs can be reduced by removing NPS state values that do not affect the output logic of the current hierarchical level.

Some NPS state values can affect the output of a top level analysis despite those NPSs not participating directly in the computation of the top level analysis. Therefore, in one embodiment, before removing the state values associated with an NPS from the PST, a modeler (a) identifies the PSs and NPSs for a block model, (b) merges individual block PSTs first using all power supplies (i.e., both PSs and NPSs) so that the constraints from the set of NPSs are applied to the set of PSs during that time, (c) removes the NPSs from the block level merged power state table, and (d) uses this reduced power state table of the logic block to create a top level merged PST. This approach reduces the number of supplies used in the top level merged PST without introducing inaccuracies to the low power signoff checks.

Advantageously, the present disclosure increases the speed of analysis of the circuits, without reducing accuracy of the results or verification thereof.

FIGS. 1A-1F illustrate an example hierarchical merger of PSTs for use in analyzing a hierarchical logical block model of a circuit, according to embodiments of the present disclosure. As will be appreciated, although FIGS. 1A-1F show a given number of elements in a set arrangement, various embodiments are contemplated that include more or fewer elements in various arrangements beyond those illustrated.

Figure 1A:
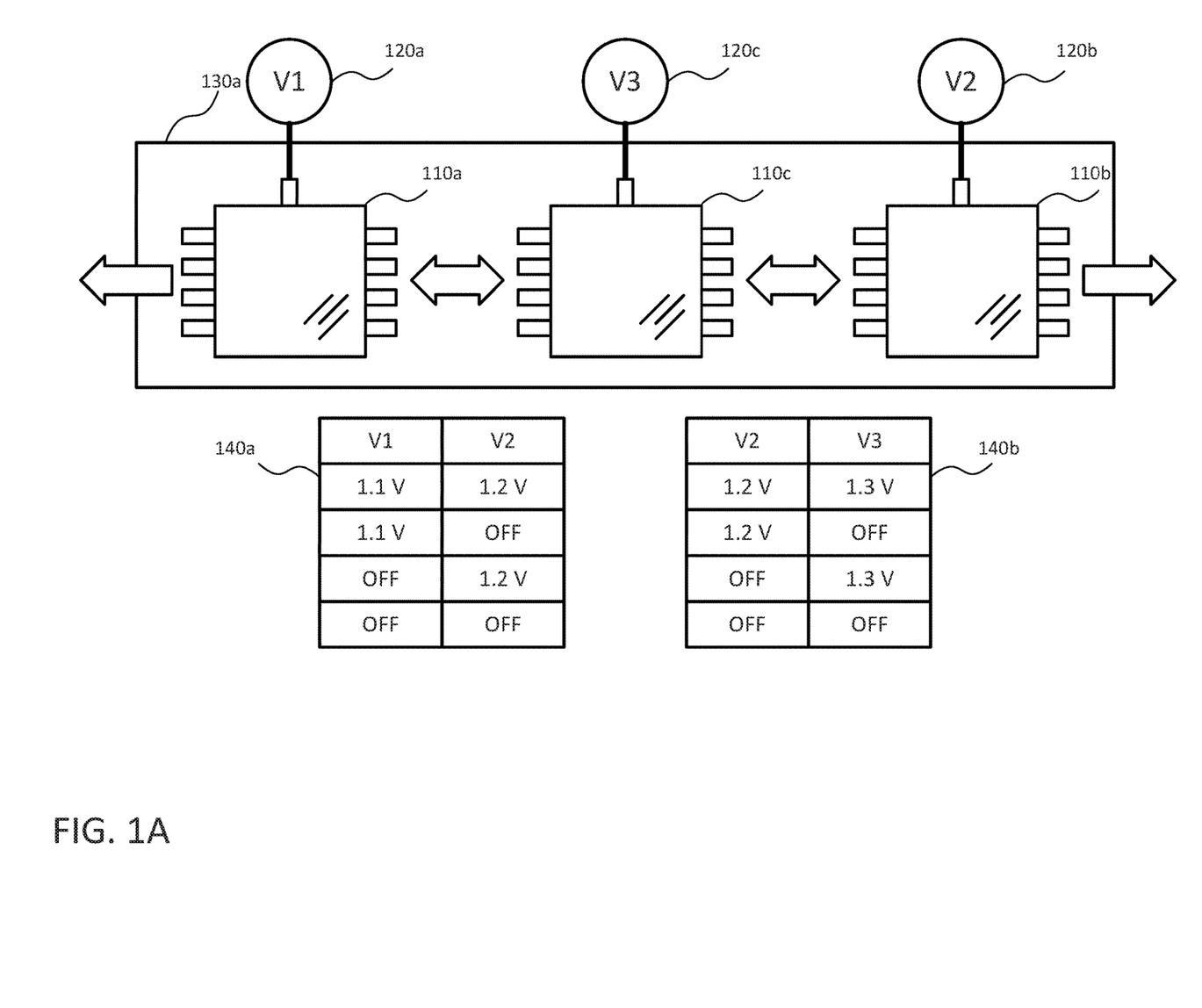
FIGS. 1A-1F illustrate an example hierarchical merger of power state tables for use in analyzing a hierarchical logical block model of a circuit, according to embodiments of the present disclosure.

FIG. 1A illustrates a first logic block 110a (generally or collectively, logic block 110) associated with a first power supply 120a (generally or collectively, power supply 120), a second logic block 110b associated with a second power supply 120b, and a third logic block 110c associated with a third power supply 120c in a first hierarchical group 130a (generally or collectively, hierarchical group 130). Each of the logic blocks 110 represent one or more sets of logical gates controlled by a shared or common power supply 120.

Although three logic blocks 110 are illustrated in the first hierarchical group 130a, in various embodiments, a hierarchical group 130 can include various numbers of logic blocks 110, with different interrelations between those logic blocks 110. The individual logic blocks 110 are classified as one of a peripheral logic block or a non-peripheral logic block based on whether the output of the logic block are transmitted outside of the hierarchical group 130 (as a peripheral logic block) or are only provided to other logic blocks 110 within the hierarchical group 130 (as a non-peripheral logic block). In FIGS. 1A-1F, the first logic block 110a and the second logic block 110b are peripheral logic blocks for the first hierarchical group 130a, and the third logic block 110c is a non-peripheral logic block for the first hierarchical group 130a because the third logic block 110c only communicates with logic blocks within the first hierarchical group 130a.

The power supplies 120 have an OFF state and one or more ON states with various power levels supplied to the associated logic block 110. The power states for the first power supply 120a and the second power supply 120b are represented in a first combined PST 140a (generally or collectively, combined PST 140) with the voltage provided by the first power supply 120a represented as 1.1 V (Volts) and the voltage provided by the second power supply 120b represented as 1.2 V. Similarly, the power states for the second power supply 120b and the third power 120c are represented in a second combined PST 140b with the voltage provided by the second power supply 120b represented as 1.2 V (as per the first combined PST 140a) and the voltage provided by the third power supply 120c represented as 1.3 V. It will be noted that a combined PST 140 for the first power supply 120a and the third power supply 120c is not shown, but may be derived by merging the first combined PST 140a and the second combined PST 140b or by examining the individual potential power states of the first power supply 120 and the third power supply 120c. As will also be appreciated, the designations of "first," "second," "third," etc., used herein can be applied to any of the individual elements to distinguish one element from another.

Figure 1B:
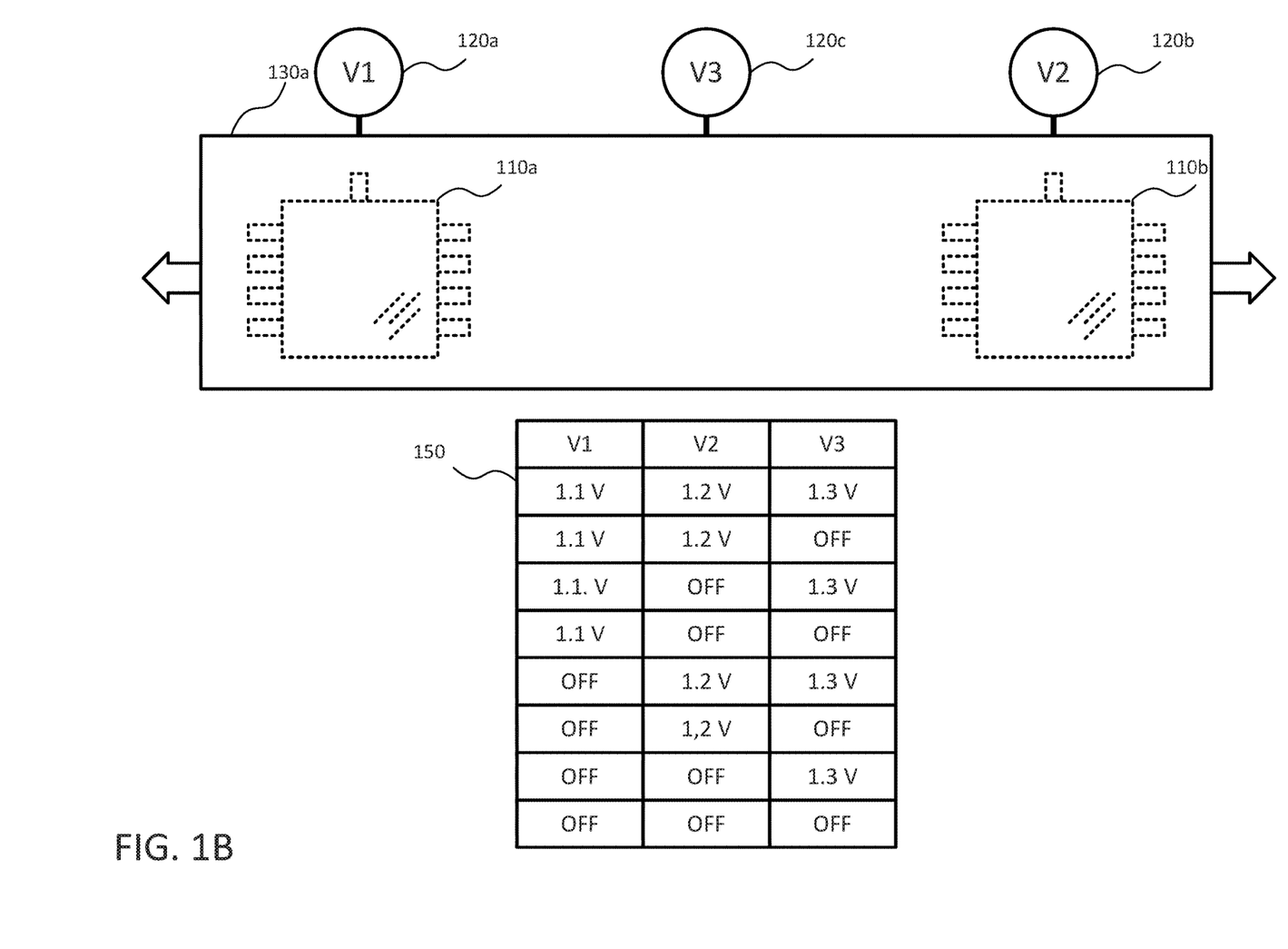

FIG. 1B illustrates the first hierarchical group 130a analyzed based on the peripheral logic (e.g., in the peripheral logic blocks of the first logic block 110a and the second logic block 110b) that omits the non-peripheral logic (e.g., the non-peripheral logic block of the third logic block 110c) to simplify analysis of the first hierarchical group 110b in a next-higher and subsequent hierarchical groups 130. However, the third power supply 120c is still modeled, as the power states of the third power supply 120c are still included in a merged PST 150 that represent all of the power supplies 120 included in the first hierarchical group 130a. The merged PST 150 combines the combined PSTs 140 in the logic block 110 contained in the hierarchical level because the power states of the non-peripheral logic blocks (e.g., the third logic block 110c and the corresponding third power supply 120c) may affect the outputs of the peripheral logic blocks (e.g., first logic block 110a and second logic block 110b). The merged PST 150 in FIG. 1B therefore includes the power states for each of the power supplies 120 included in the combined PSTs 140 from FIG. 1A, which increases the number of entries from two sets of four power states (per the first combined PST 140a and the second combined PST 140b) to one set of eight power states. As will be appreciated, as the number of rows in the individual combined PSTs 140 increase, and the number of combined PSTs 140 increase, the size of the merged PST 150 increases exponentially. The embodiments below describe techniques for reducing the resulting size of the merged PST to avoid this exponential expansion in complexity.

Figure 1C:
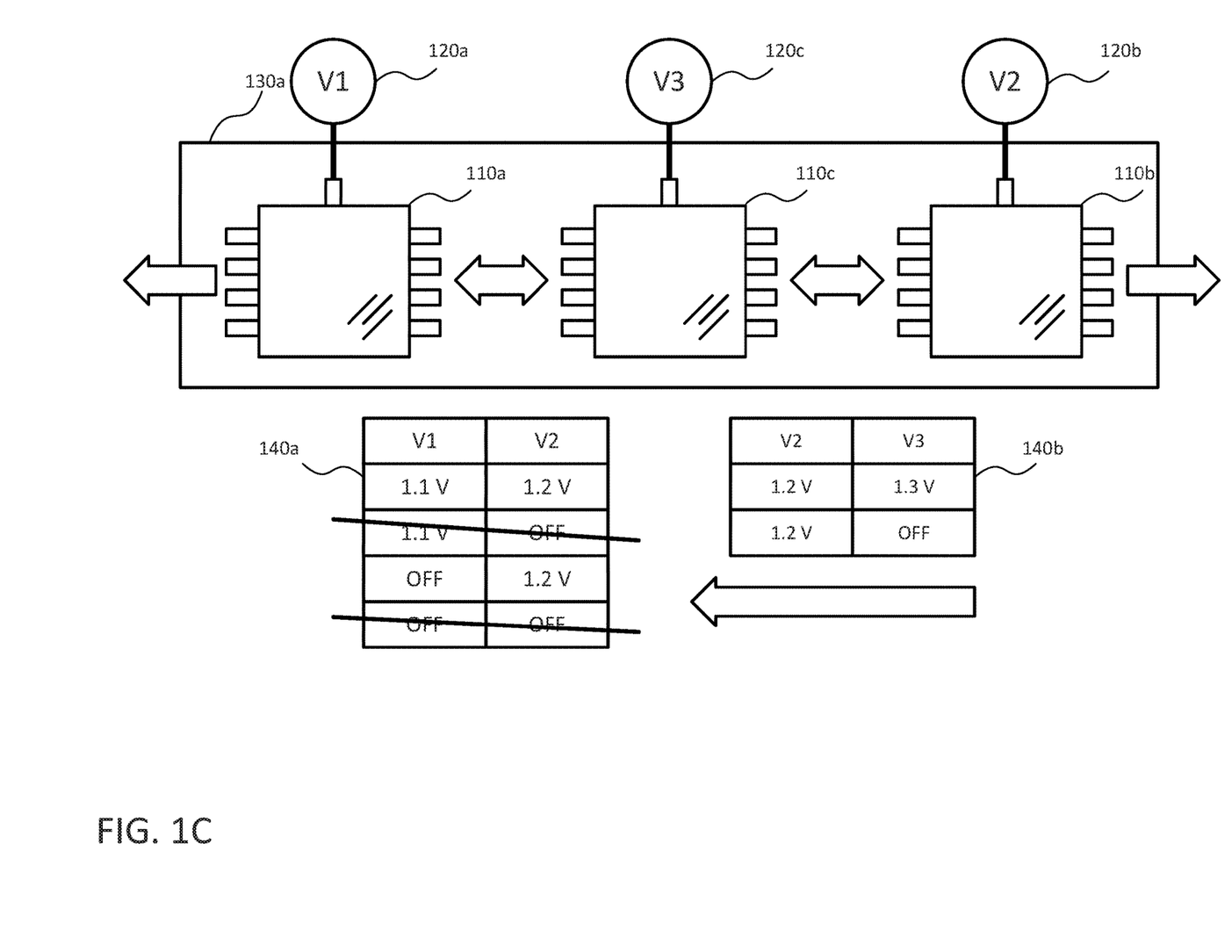
Figure 1D:
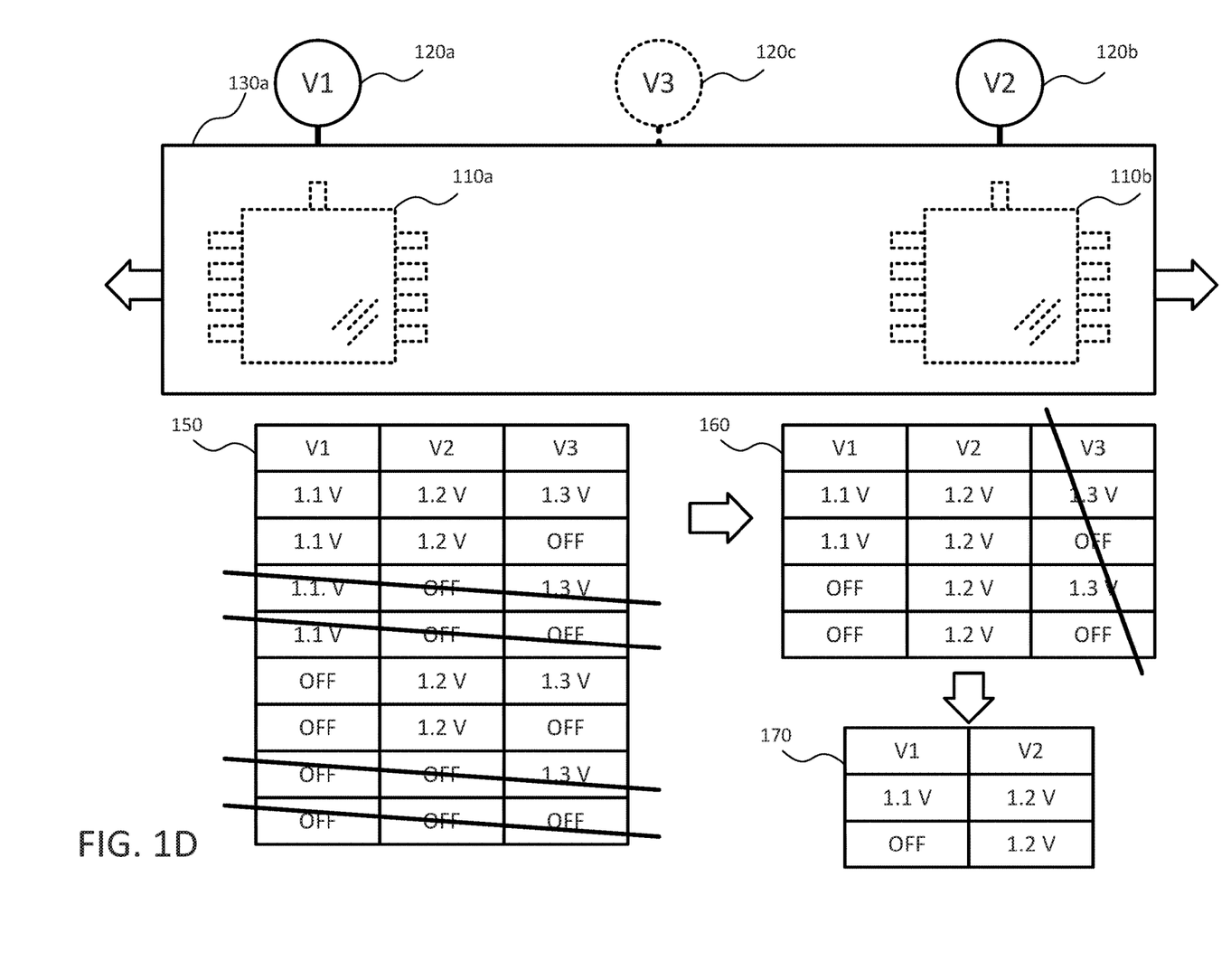

FIGS. 1C and 1D illustrate how the power states, when constrained, can be used to remove power states from the PST and reduce the complexity in modeling the hierarchical group 130. For example, when the control logic for the circuit imposes the constraint that the second combined PST 140b does not operate in an OFF state (or another selected state), the constraint reduces the size of the second combined PST 140b, and when merged with the first combined PST 140a, produces a merged PST 150 without the associated rows for the second power source 120b in the OFF state (reducing the total number of rows to four) to produce a constrained PST 160. As will be appreciated, other constraints based on the observed operational logic of the power supplies 120 can be imposed in various embodiments so that unused power states for the various power supplies 120 are removed from the PSTs.

The constrained PST 160, in turn, is further reduced to remove the power states of the third power supply 120c to produce a reduced PST 170 for the first hierarchical group 130a, at which point the third power supply 120c can be removed from the analysis of the circuit. The analysis can remove any power supply from the reduced PST 170 that is identified as a non-peripheral supply (NPS). To qualify as an NPS, a power supply 120 is both: not referred to by any peripheral logic block in a given hierarchical group 130 and not referred to by a low power path in the model. Stated differently, when a power supply 120 does not directly control a peripheral logic block or indirectly affect the power states exhibited by a power supply 120 associated with a peripheral logic block (e.g., via direct control of a non-peripheral logic block), that power supply 120 is classified as a NPS, and can safely be removed from the PST without affecting analysis of the circuit 100 model in the next level of hierarchical analysis.

Figure 1E:
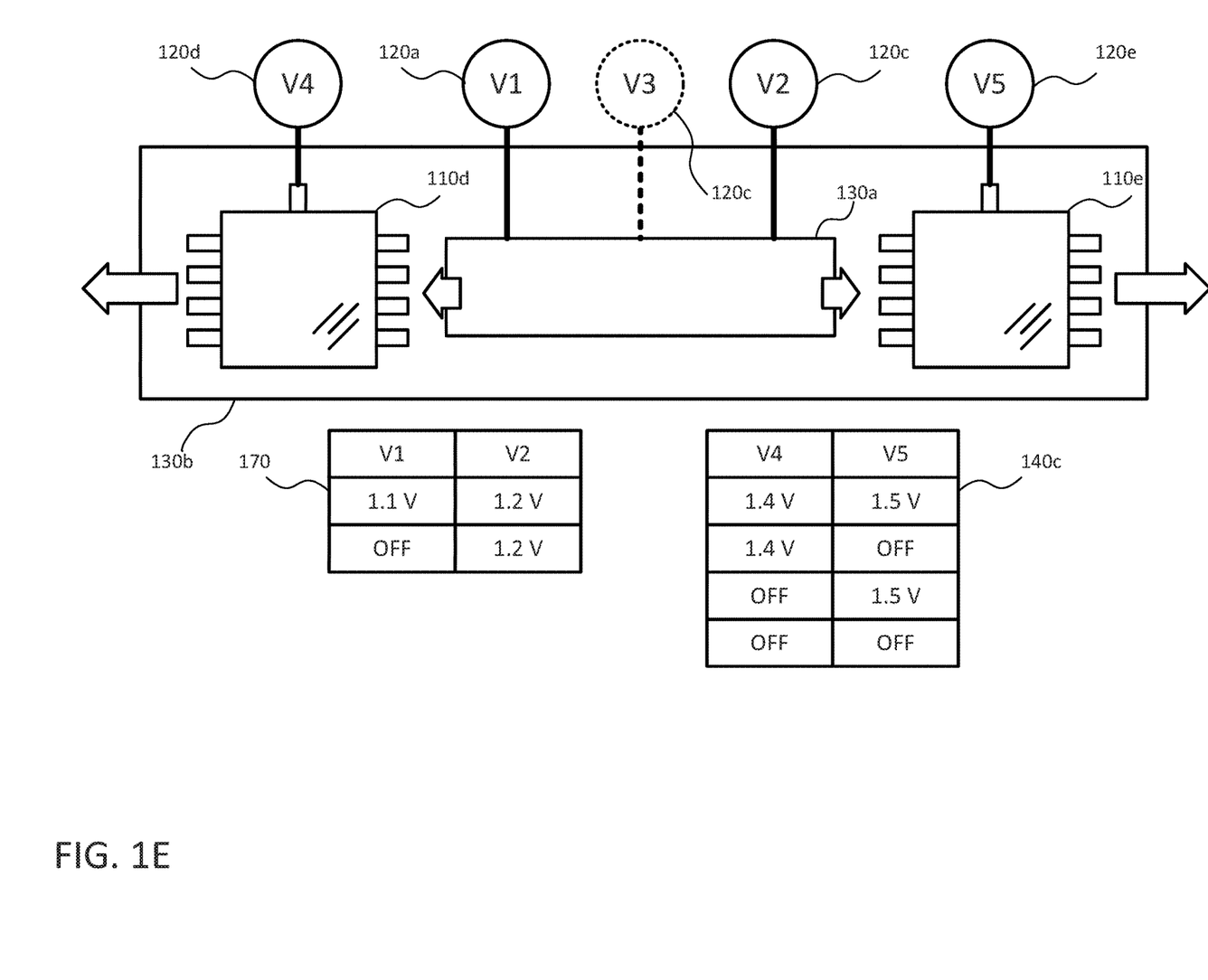

FIG. 1E illustrates a second hierarchical group 130b of the analysis circuit that includes the first hierarchical group 130a therein as well as a fourth logic block 110d and a fifth logic block 110e. In various embodiments, one or more of the fourth logic block 110d and the fifth logic block 110e are also hierarchical groups 130, similar to the first hierarchical group 130a, that analyze the logic of several component logic blocks 110 at the same hierarchical level as the first hierarchical group 130a, albeit in different groupings. The second hierarchical group 130b includes a third combined PST 140c that describes the relationships between the power states for the fourth power supply 120d and the fifth power supply 120e, with the voltage provided by the fourth power supply 120d represented as 1.4 V and the voltage provided by the fifth power supply 120e represented as 1.5 V.

Figure 1F:
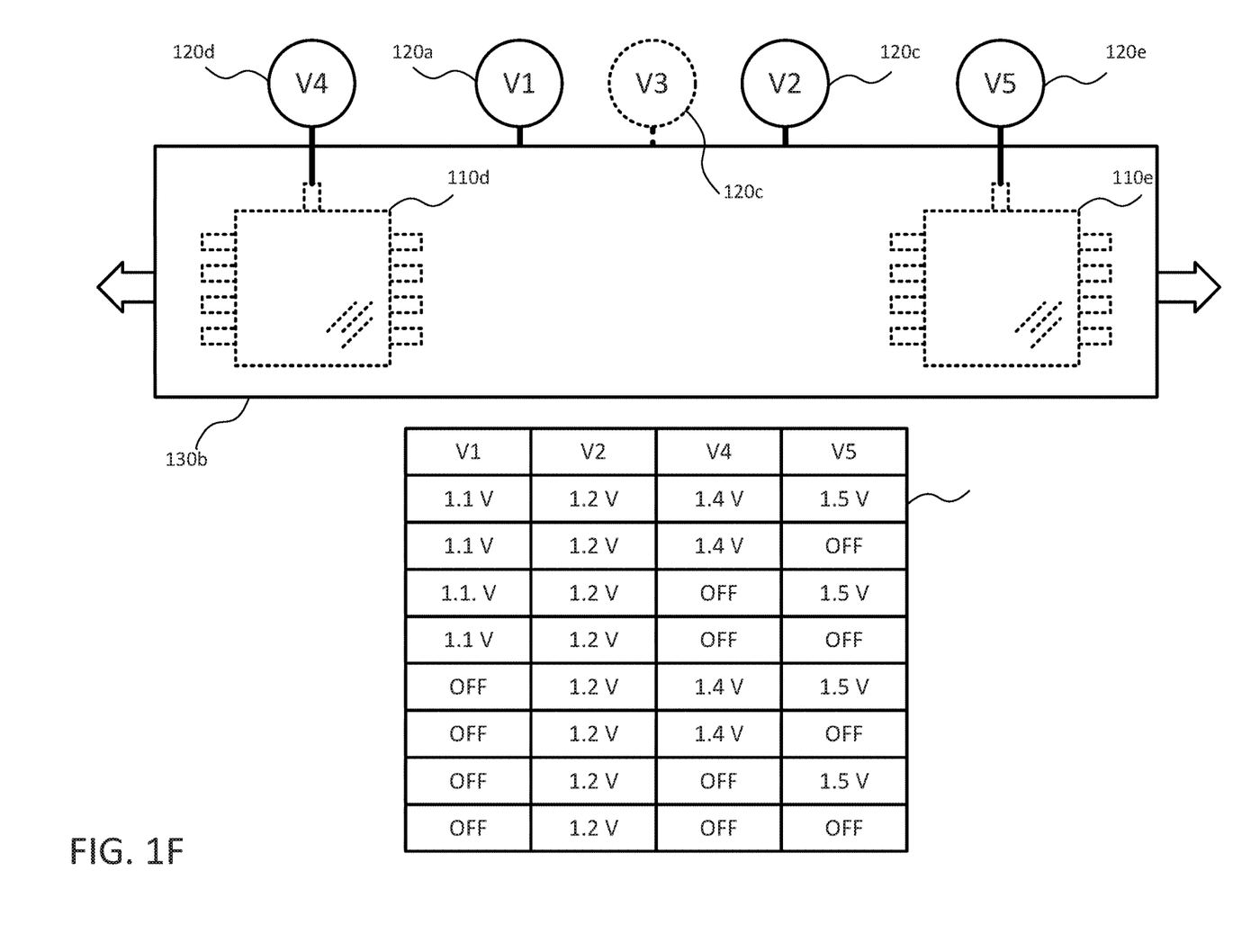

FIG. 1F illustrates a top level analysis of the second hierarchical group 130a and the resulting PST 180 for the permissible power states between the various power supplies 120 included therein. To indicate the relationships between the first through fifth power supplies 120a-e, a merge operation is performed between the reduced PST 170 and the third combined PST 140c to identify all permissible power states between the various power supplies 120a-e in the resulting PST 180. Although the second hierarchical group 130b analyzes the logic and supplies included therein, because the third power supply 120c has been identified as a NPS in a lower hierarchical level model, the power states for the third power supply 120c can be removed or omitted, thus reducing complexity in modeling the circuit for low power analysis.

However, to correctly account for the NPS signals on the operational logic of the circuit in the analysis, the NPS should not simply be ignored when creating a PST for the top level hierarchical group 130. Instead, the power states of the NPS are included in the PST via the various merges described herein in relation to FIGS. 1A-1F, which may be repeated as appropriate for each hierarchical group 130 in the circuit. First, a power state merge is performed with all power supplies (both PS and NPS) in a given hierarchical group 130 (e.g., per FIGS. 1A and 1B). Second, columns for power states provided by NPS are removed to create a constrained PST 160. Third, duplicate rows of power states are consolidated to leave each row in the PST unique in the reduced PST 170.

For large hierarchical groups 130, which may include hundreds of power supplies, the number of NPS can represent a large fraction of the total number of supplies, and the removal thereof can represent a significant reduction of complexity in the final PST or in an intermediate PST used in a next-higher hierarchical level of the analyzed circuit.

Figure 2:
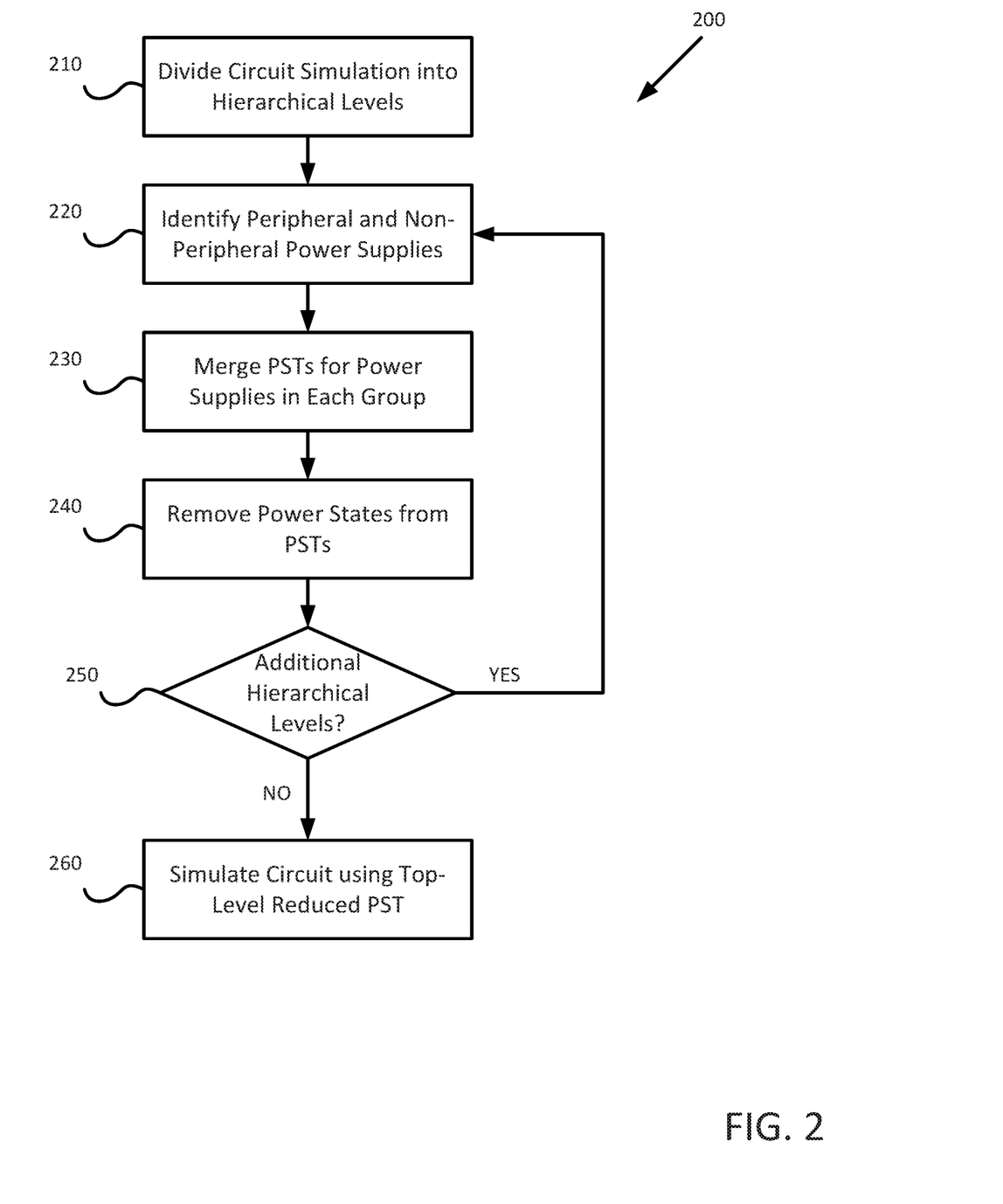
FIG. 2 is a flowchart of a method for reducing state table complexity in a hierarchical verification flow, according to embodiments of the present disclosure.

FIG. 2 is a flowchart of a method 200 for reducing state table complexity in a hierarchical verification flow, according to embodiments of the present disclosure. Method 200 begins at operation 210, where a modeling system divides a circuit undergoing hierarchical verification flow into a plurality of hierarchical levels. Each hierarchical level describes groupings of various logic in the circuit, where higher hierarchical levels include one or more lower hierarchical levels. Several separate groups can be at the same level hierarchically, which the modeling system combines at a various higher hierarchal levels. When the modeling system reaches a top level of the hierarchy, which includes all of the groups, all of the circuit analyzed are combined. Accordingly, the modeling system performs method 200 starting at the lowest tier of the hierarchical levels analyzing the circuit and works upward to the top level.

At operation 220, the modeling system identifies which power supplies in the current hierarchical level are PS and which are NPS. Peripheral power supplies are those power supplies associated with logic blocks that accept input from or provide output to logic blocks that are outside of the current group of logic blocks. In contrast, non-peripheral power supplies are those power supplies associated with logic blocks that do not accept input from or provide output to logic blocks that are outside of the current group of logic blocks.

At operation 230, the modeling system merges PSTs for all of the supplies within a given group at the current hierarchical level. Each power supply is associated with an OFF state and at least one ON state, and may be associated with several ON states of different voltages.

At operation 240, the modeling system removes power states associated with the NPSs from the PSTs. In some embodiments, based on the control logic for the power supplies, the modeling system removes any unused power states of the PS from the PST. For example, if a given PS has available power states of OFF, 1.1 V, and 1.2 V, but is only operated at OFF or 1.2 V, the modeling system removes power states associated with the given PS operating at 1.1 V from the PST. In another example, a PS (S1) has states of {OFF, 1.1, 1.2}, and a NPS (S2) supply has states of {OFF, 1.4}, resulting in PST combinations for {S1, S2}={{1.1, 1.4}, {1.1, OFF}, {OFF, OFF}}. These combinations place a constraint that there is no legal combination of S1 and S2 where S1=1.2, which makes all power states in the PST in which S1=1.2 INVALID. These INVALID power state combinations are eliminated as part of PST merging. Once the modeling system removes the power states associated with the NPSs (and optionally any unused power states for the PS), the modeling system removes duplicate entries from the PST for the group.

At operation 250, the modeling system determines whether additional hierarchical levels above the current hierarchical level exist for the analyzed circuit.

When additional hierarchical levels exist (i.e., the current hierarchical level is not the top hierarchical level), method 200 returns to operation 220, where the reduced PSTs developed for the current level are used in the next hierarchical level. Because each group of logic blocks in a given hierarchical level can represent a peripheral logic block or a non-peripheral logic block in the next-higher hierarchical level, the reduced PST for that group can represent a set of peripheral supplies or a set of non-peripheral supplies. Accordingly, when returning to operation 220, the modeling system re-identifies which power supplies are now considered peripheral or non-peripheral for the next iteration of method 200.

When additional hierarchical levels do not exist (i.e., when the current hierarchical level is the top hierarchical level), method 200 proceeds to operation 260, where the modeling system uses the top-level reduced PST to analyze the circuit. Method 200 may then conclude.

Figure 3:
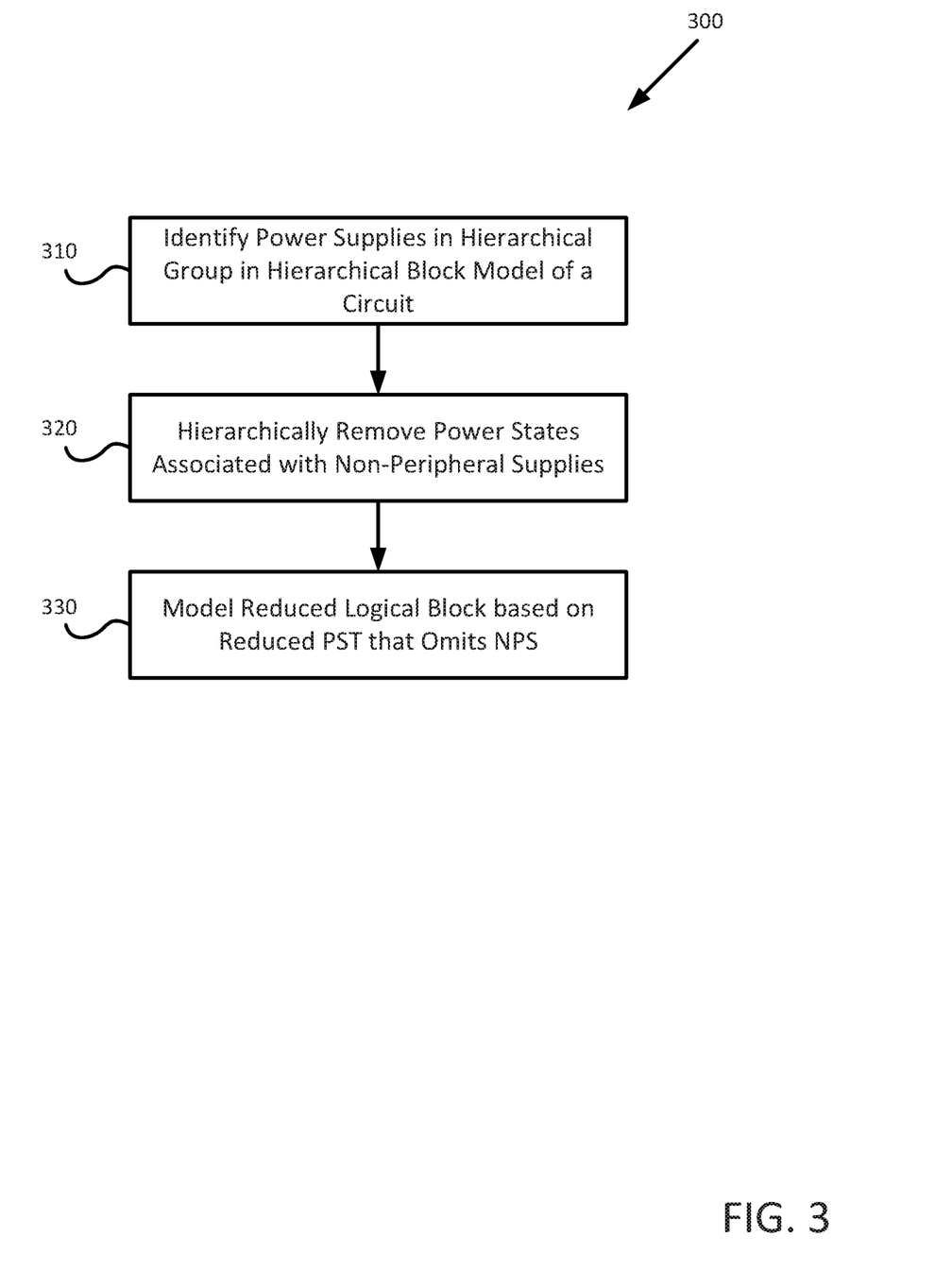
FIG. 3 is a flowchart of a method for reducing state table complexity in a hierarchical verification flow, according to embodiments of the present disclosure.

FIG. 3 is a flowchart of a method 300 for reducing state table complexity in hierarchical verification flow, according to embodiments of the present disclosure. Method 300 begins at operation 310, where a modeling system identifies PSs and NPSs in a hierarchical group in a hierarchical logical block model of a circuit. Each hierarchical group analyzes a subset of the circuit elements, including logic gates and other physical components, and is associated with one or more power supplies that drive those logic gates. A circuit can include a plurality of hierarchical groups, and several groups can be defined individually at the same hierarchical level as one another. The hierarchical levels are tiered so that the one or more hierarchical groups at the first level are included in one or more hierarchical groups in a second level, which are in turn included in one or more hierarchical groups at the next-higher level until a top hierarchical level is reached. The top hierarchical level includes all of the circuit elements in the lower hierarchical levels and represents a reduced or simplified model of the circuit.

The modeling system identifies a given power supply as a one of peripheral or non-peripheral based on the inputs and outputs for the logic block associated with the given power supply. The non-peripheral supplies are associated with logic blocks in the hierarchical group that do not accept input from outside of the hierarchical group and that do not provide output outside to the hierarchical group. In contrast, the peripheral supplies are associated with logic blocks than may receive inputs or outputs with logic blocks internal to the hierarchical group, but also receive at least one input or provide at least one output externally to the hierarchical group currently being analyzed.

Because the modeling system removes various power supplies, unused power states, and repeated power state combinations from the PSTs as part of method 300, the peripheral supplies and non-peripheral supplies are identified for the first hierarchical level before the peripheral supplies and non-peripheral supplies are identified for the second hierarchical level, which are identified before the peripheral supplies and non-peripheral supplies are identified for the third hierarchical, etc. Accordingly, when identifying the power supplies as peripheral or non-peripheral for a next-higher hierarchical level, the modeling system can contend with fewer power supplies and fewer associated power states therefor, thereby increasing the speed of circuit analysis and verification (with corresponding reductions in expended computing resources).

To provide an accurate PST for use in the next-higher hierarchical level (and as a final PST for the top level), method 300 proceeds to operation 310, where the modeling system merges associated PSTs for each of the peripheral supplies and the non-peripheral supplies in the hierarchical group to create a merged power state table for the hierarchical group. The merged power state table includes all of the power states for each of the power supplies included in the individual group, however, when multiple groups are defined at the same hierarchical level, each group is merged separately to produce an independently merged PST for each of the individual groups based on the power supplies in one group. Each power supply is associated with an OFF state and one or more ON states (e.g., different voltage values provided when in the ON state).

At operation 320, the modeling system hierarchically removes any power states associated with the non-peripheral supplies from the merged power state table to create a reduced PST for the group. In some embodiments, the modeling system also removes any states (ON or OFF) that are unused power states from the peripheral supplies (e.g., when control logic never uses a given available state, the given state is removed from the PST), and removes any repeated or duplicate entries in the reduced PST (e.g., where entry$_1$: V$_1$=OFF, V$_2$=OFF, entry$_2$: V$_1$=OFF, V$_2$=OFF the modeling system removes one of entry$_1$ and entry$_2$ from the reduced PST).

In various embodiments, a group at the second (or higher) hierarchical level can combine one or more groups from lower hierarchical levels with each other using the earlier-produced reduced PSTs. When the modeling system identifies the power supplies in the next-higher hierarchical level as a PS or NPS, the NPS from the lower hierarchical levels are omitted, and the PS from the lower hierarchical levels are re-identified as being one of a PS or NPS based on the inputs/outputs to the associated logical block group being at least partially external or fully internal to the new group at the next-higher hierarchical level. Accordingly, the number of power supplies and associated power states analyzed at the next-higher hierarchical level is reduced when the lower level groups are remodeled as a logical block with fewer power states in a logic block in the next-higher hierarchical level.

At operation 330, the modeling system models a reduced logical block based on the reduced power state tables produced in response to reaching the top hierarchical level. As each hierarchical level is analyzed and produces a reduced PST that is used in the next-higher hierarchical levels, the overall number of power supplies (and power states associated therewith) is continuously reduced as the modeling system traverses the hierarchical levels. Accordingly, once the top hierarchical level is reached, several thousand power supplies and associated power states can be removed from the analysis of the circuit without affecting the operation thereof, thus significantly improving the speed of analysis without reducing the accuracy of analysis. Method 300 may then conclude.

Figure 4:
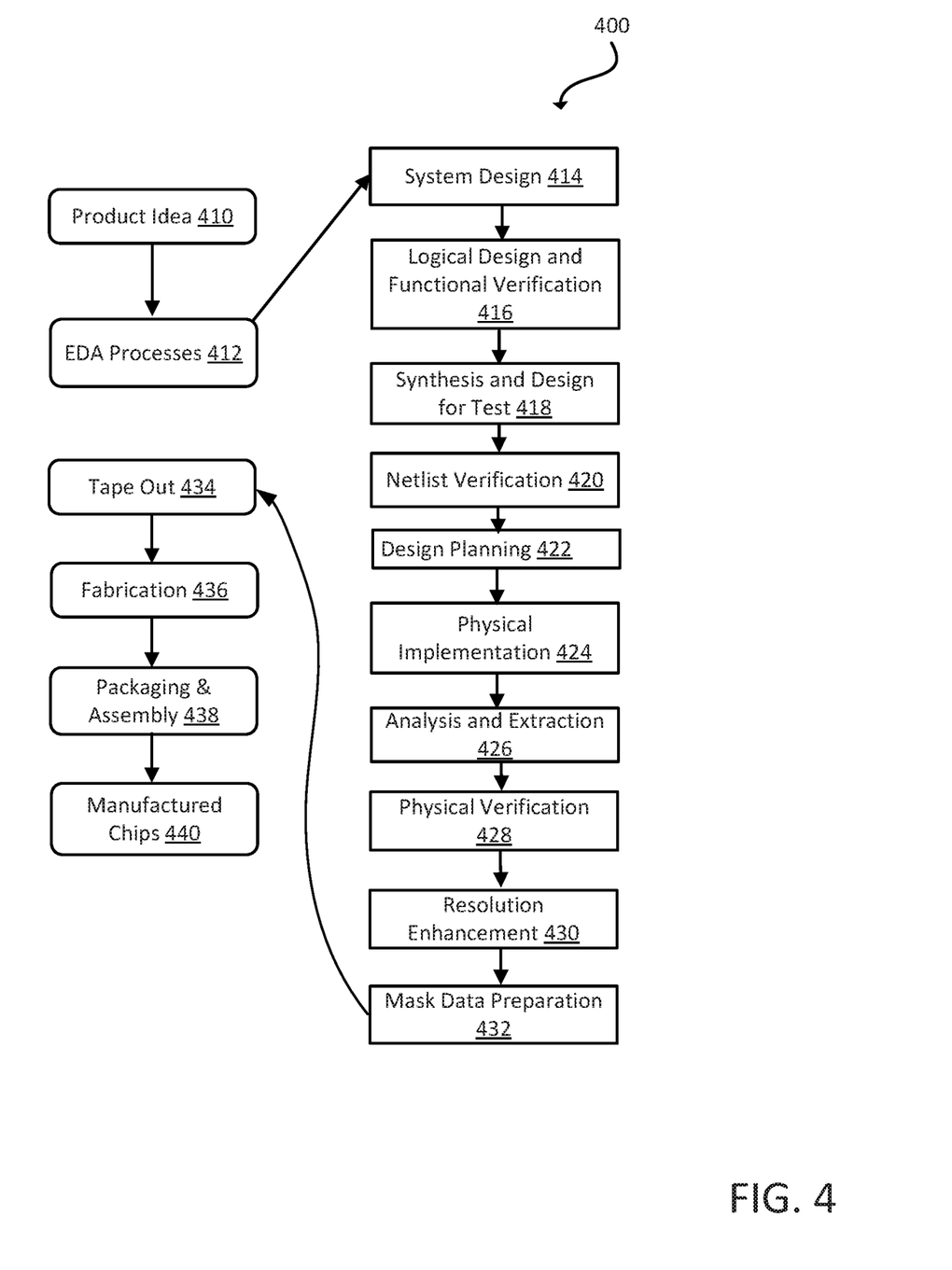
FIG. 4 illustrates an example set of processes used during the design, verification, and fabrication of an article of manufacture such as an integrated circuit in accordance with some embodiments of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 4. The processes described by be enabled by EDA products (or tools).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 510 of FIG. 5) may be used to store the programs and data structures that are used by some or all of the EDA products described herein, and products used for development of cells for the library and for physical and logical design that use the library.

Figure 5:
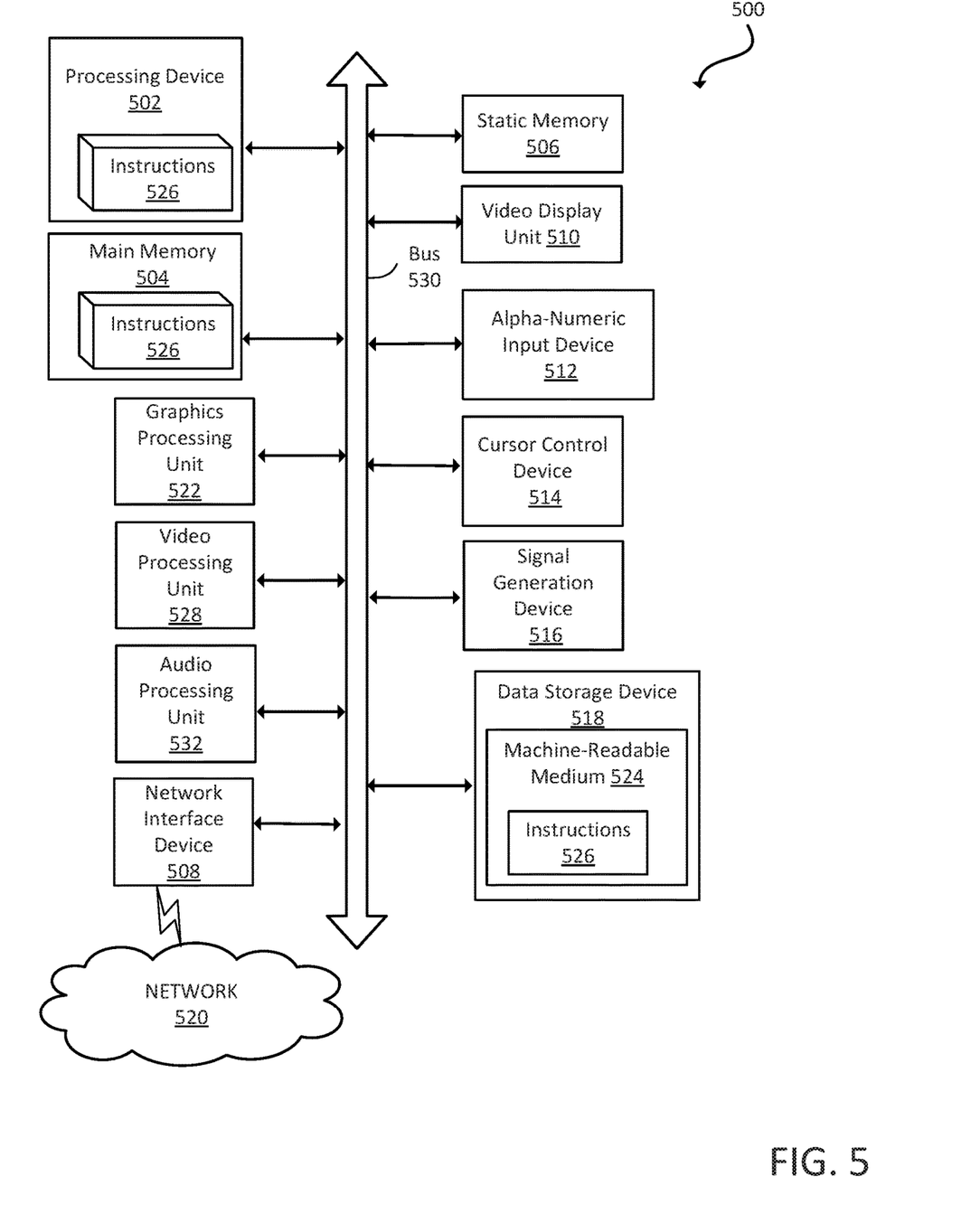
FIG. 5 depicts an example computer systems in which embodiments of the present disclosure may operate according to embodiments of the present disclosure.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    identifying peripheral supplies and non-peripheral supplies in a hierarchical group in a hierarchical logical block model of a circuit based on whether logic blocks associated with the peripheral and non-peripheral supplies provide outputs to or receive inputs from circuity external to the hierarchical group;
    merging associated power state tables for the peripheral supplies and the non-peripheral supplies in the hierarchical group to create a merged power state table for the hierarchical group;
    removing, by a processing device, any power states associated with the non-peripheral supplies from the merged power state table to create a reduced power state table; and
    modeling a reduced logical block based on the reduced power state table.

2. The method of claim 1, further comprising:
    identifying second peripheral supplies and second non-peripheral supplies in a next-higher hierarchical group that includes the hierarchical group in the hierarchical logical block model of the circuit, wherein the peripheral supplies are associated with the hierarchical group;
    merging associated second power state tables for each of the second peripheral supplies and the second non-peripheral supplies in the next-higher hierarchical group to create a second merged power state table for the next-higher hierarchical group, wherein the reduced power state table is treated as one of the associated power state tables;
    removing any power states associated with the second non-peripheral supplies from the second merged power state table to create a second reduced power state table; and
    modeling a second reduced logical block based on the second reduced power state table.

3. The method of claim 1, further comprising:
    identifying second peripheral supplies and second non-peripheral supplies in a second hierarchical group in the hierarchical logical block model of the circuit at a shared hierarchical level with the hierarchical group;
    merging associated power state tables for each of the second peripheral supplies and the second non-peripheral supplies in the second hierarchical group to create a second merged power state table for the second hierarchical group;
    removing any power states associated with the second non-peripheral supplies from the second merged power state table to create a second reduced power state table; and
    merging the reduced power state table with the second reduced power state table when modeling a next-higher hierarchical group that includes the hierarchical group and the second hierarchical group.

4. The method of claim 1, wherein the non-peripheral supplies are associated with logic blocks in the hierarchical group that do not accept input from outside of the hierarchical group and that do not provide output outside to the hierarchical group.

5. The method of claim 1, further comprising:
    identifying unused and used power state for a peripheral supply; and
    removing the unused power state from the reduced power state table.

6. The method of claim 1, further comprising:
    removing duplicate entries from the reduced power state table.

7. The method of claim 1, wherein the power states associated with the non-peripheral supplies include a plurality of ON states and an OFF state.

8. A system, comprising:
    a processor; and a memory including instructions that when executed by the processor enable the processor to:
- divide a circuit undergoing hierarchical verification flow into a plurality of hierarchical levels having a plurality of hierarchical groups;
- identify which power supplies analyzed in the circuit in a first hierarchical level are peripheral supplies and which of the power supplies are non-peripheral supplies based on whether logic blocks associated with the power supplies receive inputs from or provide outputs to circuity external to the hierarchical groups;
- merge, in each group at the first hierarchical level, power state tables for the power supplies within each individual group;
- remove, in each group, power states associated with the non-peripheral supplies for each corresponding group to produce a corresponding reduced power state table for each individual group; and
- in response to determining that the first hierarchical level is not a top hierarchical level for the circuit, output the corresponding reduced power table for each group in analyzing a next-higher hierarchal level of the circuit.

9. The system of claim 8, wherein the instructions further enable the processor to:
- identify which next-higher power supplies analyzed in the circuit in next-higher hierarchical level are next-higher peripheral supplies and which of the next-higher power supplies are next-higher non-peripheral supplies, wherein the peripheral supplies from the first hierarchical level are included in the next-higher power supplies;
- merge, in each next-higher group at the next-higher hierarchical level, next-higher power state tables for all of the next-higher power supplies within each individual next-higher group; and
- remove, in each next-higher group, next-higher power states associated with the next-higher non-peripheral supplies for each corresponding next-higher group to produce a corresponding next-higher reduced power state table for each individual next-higher group.

10. The system of claim 9, wherein the instructions further enable the processor to:
- in response to determining that the first hierarchical level is the top hierarchical level for the circuit, model the circuit based on the corresponding next-higher reduced power state table.

11. The system of claim 8, wherein the instructions further enable the processor to:
- remove unused power states for the peripheral supplies from the corresponding reduced power state table for each individual group.

12. The system of claim 8, wherein the instructions further enable the processor to:
- remove repeated power state combinations from the corresponding reduced power state table for each individual group.

13. The system of claim 8, wherein the peripheral supplies are associated with peripheral logic blocks that are connected to at least one of an input and an output external to the groups, and wherein the non-peripheral supplies are associated with non-peripheral logic blocks that are not connected to any inputs or outputs external to the groups.

14. The system of claim 8, wherein each of the peripheral supplies are associated with an OFF state and at least one ON state.

15. A non-transitory computer readable storage medium including instructions that when executed by a processor cause the processor to:
- modeling a set of logic blocks as a simplified logic block comprising a first peripheral logic block, a second peripheral logic block, and a non-peripheral logic block;
- identify a first power supply associated with the first peripheral logic block, a second power supply associated with the second peripheral logic block, and a third power supply associated with the non-peripheral logic block;
- generate a first combined power state table for the first power supply and the second power supply;
- generate a second combined power state table for the second power supply and the third power supply;
- merge the first combined power state table and the second combined power state table with a constraint imposed by the second combined power state table to create a merged power state table;
- remove power states for the third power supply from the merged power state table to produce a reduced power state table; and
- remodel the set of logic blocks with the non-peripheral logic block and the third power supply removed based on the reduced power state table.

16. The non-transitory computer readable storage medium of claim 15, wherein the set of logic block as remodeled is identified as a second non-peripheral logic block to a third peripheral logic block and a fourth peripheral logic block.

17. The non-transitory computer readable storage medium of claim 15, wherein the non-peripheral logic block represents a lower-hierarchy level including a third peripheral logic block and a fourth peripheral logic block.

18. The non-transitory computer readable storage medium of claim 17, wherein the set of logic blocks includes a plurality of non-peripheral logic blocks associated with a corresponding plurality of power supplies, wherein the second combined power state table includes power states for each of the plurality of power supplies.

19. The non-transitory computer readable storage medium of claim 15, wherein the first power supply, the second power supply and the third power supply are associated with individual power levels and an off state.

20. The non-transitory computer readable storage medium of claim 19, wherein at least one of the first power supply, the second power supply and the third power supply is associated with a plurality of individual power levels.

* * * * *